United States Patent [19]
Bromberg et al.

[11] Patent Number: 5,409,784
[45] Date of Patent: Apr. 25, 1995

[54] PLASMATRON-FUEL CELL SYSTEM FOR GENERATING ELECTRICITY

[75] Inventors: Leslie Bromberg, Sharon; Daniel R. Cohn, Chesnut Hill; Alexander Rabinovich, Salem, all of Mass.

[73] Assignee: Massachusetts Institute of Technology, Cambridge, Mass.

[21] Appl. No.: 89,038

[22] Filed: Jul. 9, 1993

[51] Int. Cl.⁶ .............................................. H01M 8/06
[52] U.S. Cl. .......................................... 429/13; 429/9; 429/21; 180/65.3
[58] Field of Search ................. 429/9, 21, 13; 204/169, 204/171; 423/650, DIG. 10; 180/65.3, 65.7

[56] References Cited

U.S. PATENT DOCUMENTS

| | | | |
|---|---|---|---|
| 3,982,962 | 9/1976 | Bloomfield | 429/19 |
| 3,992,277 | 11/1976 | Trieschmann et al. | 204/171 X |
| 4,436,793 | 3/1984 | Adlhart | 429/21 X |
| 4,657,829 | 4/1987 | McElroy et al. | 429/21 X |
| 4,928,227 | 5/1990 | Burba et al. | 180/65.3 X |
| 5,139,894 | 8/1992 | Mizuno et al. | 429/9 |
| 5,205,912 | 4/1993 | Murphy | 204/171 X |

*Primary Examiner*—Stephen Kalafut
*Attorney, Agent, or Firm*—Choate, Hall & Stewart

[57] ABSTRACT

A plasmatron for generating hydrogen rich gas from hydrocarbon fuel is connected to deliver the hydrogen rich gas to a fuel cell. The fuel cell generates electricity, a moderate portion of the generated electricity being supplied to the plasmatron to sustain its operation. Embodiments include both vehicular applications and decentralized power generating stations. The plasmatron may be either a water plasmatron or a water free plasmatron. Suitable fuels for the plasmatron to reform include gasoline, diesel fuel, natural gas, JP4, and biomass derived fuels. The plasmatron supplies hydrogen rich gas or other molecular species to fuel cells of conventionally known designs. The overall efficiency of the plasmatron/fuel cell system can be as high as 48%.

33 Claims, 8 Drawing Sheets

PLASMATRON-FUEL CELL SYSTEM FOR GENERATING ELECTRICITY

BACKGROUND OF THE INVENTION

With the increased concern about environmental quality, there is a need for new technology to greatly reduce nitrogen oxide, carbon monoxide, hydrocarbon and particulate emissions from land based vehicles such as buses, trucks, automobiles and locomotives. Further, the increasingly tight emissions control standards, rising fuel costs, and limited land availability argue for new approaches for decentralized power generation systems. In both stationary and mobile applications, there is also a need for increased efficiency as compared to currently existing vehicles and power generating stations.

Fuel cells which have been developed in order to directly convert chemical energy into electricity have found applications in a variety of areas such as power sources on spacecraft. See, Patil, P. G., *J. of Power Sources* Vol. 37, 171 (1992). Fuel cells offer the advantages of low atmospheric pollution, high efficiency (up to 60%), compactness and modularity. In a fuel cell, hydrogen-rich gas and oxygen, typically from air, flow through porous electrodes and create electric current as the chemical reactions release electrons at one electrode and absorb them at the other. Some fuel cells require very pure hydrogen gas while others can tolerate significant amounts of other species. A major factor in utilization of fuel cells is the source of hydrogen-rich gas. High temperature fuel cells (molten carbonate at 650° C. and solid oxide at 1000° C.) can produce the required hydrogen-rich gas from natural gas and methanol inside the fuel cell directly (internal reforming) without the need of an external processing unit (a reformer) to turn hydrocarbon fuels into hydrogen-rich gas; but natural gas is difficult to supply to certain locations and its use in vehicles has the problems of storage, and it requires the development of a new distribution system. Methanol is toxic, corrosive and has similar distribution problems that natural gas does. Moreover, the internal reforming of the light and heavy hydrocarbons in natural gas within the inlet manifolds and inside of the fuel cell can cause carbon deposition and the attendant plugging problems. The required hydrogen-rich gas can also be obtained from external catalytic reformers which are relatively expensive and large. Further, such reformers need special handling and require the combustion of fossil fuel for heating the reformer. In addition, the range of hydrocarbon fuels that could be processed by these reformers is limited.

Plasmatrons or plasma reformers are devices which employ an electric discharge in order to produce, for example, reducing gases including hydrogen from hydrocarbons. See, for example, Kerker, L., "Manufacture of Gaseous Reductants and Synthesis Gas using Arc Plasma Processes," *Elektrowaerme International*, Edition B, vol. 45, no. 3–4, p. 155–61 (1987). A particular water plasmatron is disclosed in USSR Patent No. 700935, August 1979 by A. Rabinovich, one of the inventors herein. See also, Kaske, G. et. al., "Hydrogen Production by the Hulls Plasma-Reforming Process," *Adv. Hydrogen Energy*, Vol. 5, (1986).

SUMMARY OF THE INVENTION

The apparatus according to the invention for generating electricity comprises a plasmatron for generating a gaseous molecular species and a fuel cell connected to receive the gaseous species to generate electricity. Another chemical species such as oxygen or air is also provided to the fuel cell. A portion of the generated electricity is supplied to the plasmatron to sustain its operation. In a preferred embodiment, the plasmatron generates a hydrogen-rich gas from a hydrocarbon and the fuel cell combines this hydrogen with oxygen from air to generate electricity a portion of which powers the plasmatron. Another molecular species suitable for hydrogen rich gas generation in the plasmatron is $NH_3$.

In one version of this preferred embodiment, the plasmatron is a water plasmatron which produces hydrogen-rich gases from gasoline and other hydrocarbon fuels which are mixed with steam. In another embodiment the plasmatron is water free and produces elemental carbon along with hydrogen gas, while operating in an oxygen deficient mode (water-free).

Suitable fuel cells include molten carbonate fuels cells (MCFC), solid oxide fuel cells (SOFC), phosphoric acid fuel cells (PAFC), proton exchange membrane fuel cells (PEMFC), and alkaline fuel cells (AFC).

In a vehicular application, the plasmatron-fuel cell system of the present invention powers a motor and offers the advantages of greater compactness and simplicity than in other fuel cell systems, the ability to use a wide range of fuels including gasoline and diesel fuel, better quality of the reformate, increased flexibility of fuel cell design, and better control of emissions. Plasmatron fuel cell systems virtually eliminate nitrogen oxide, carbon monoxide, hydrocarbon, particulate emissions and, in some operating modes, could also greatly reduce $CO_2$ emissions. Efficiency of the system is high, in the range of 30% to as high as 48%. A further advantage in a vehicular context is the existing distribution system for gasoline and diesel fuel The advantages of the present invention in a decentralized power generating context is its compactness and simplicity. The space required for a nominal 2 MW molten carbonate fuel cell plant is less than 4,500 square feet. The required 200–300 kW plasmatron would have a diameter of 0.7–1 ft. and a length in the range of 1.3–2 ft. When used with a high temperature fuel cell such as the molten carbonate fuel cell, a side product is high temperature steam which can be used in a turbine for cogeneration of electricity after a secondary heat exchanger.

Surprisingly, the plasmatron in general consumes no more than approximately 20% of the heating value of the fossil fuel in its operation and thus only a small amount of the electricity generated by the fuel cell is required for operating the plasmatron resulting in the high overall efficiency of the system. A key feature of the plasmatron/fuel cell system is that the combination of the relatively low power requirement of the plasmatron and the relatively high efficiency of the fuel cell result in a relatively high conversion efficiency of chemical energy of the hydrocarbon fuel into electricity.

DESCRIPTION OF THE PREFERRED EMBODIMENT

Figure 1:
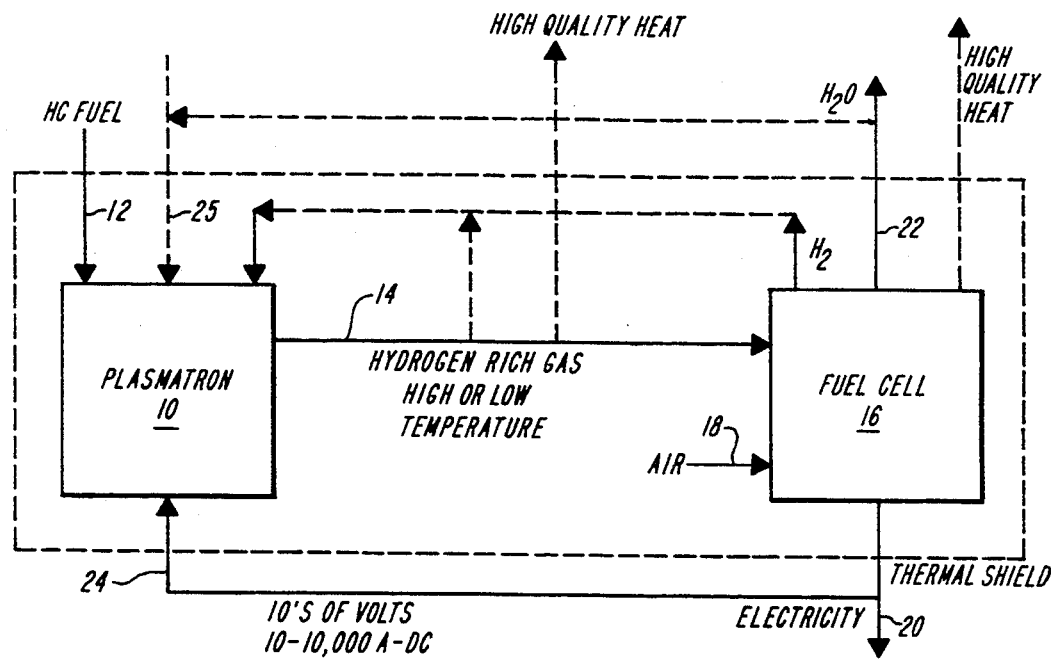
FIG. 1 is a schematic diagram of the overall system of the invention.

With reference to FIG. 1 a plasmatron/fuel cell system well suited to vehicular applications is shown. A plasmatron 10 receives a hydrocarbon fuel 12 and reforms the hydrocarbon fuel 12 to produce a hydrogen-rich gas 14 output. The hydrogen-rich gas 14 is introduced into a fuel cell 16 which combines hydrogen with oxygen from air 18 to generate electricity 20 and to produce water 22. A portion of the generated electricity 20 is supplied to the plasmatron 10 as shown at the arrow 24 to serve to energize the plasmatron 10. The water 22 produced by the fuel cell 16 may optionally be fed into the plasmatron 10 as shown at the arrow 25. The plasmatron 10 and the fuel cell 16 are electrically compatible in that fuel cells can be designed to generate electrical outputs having 10's of volts (for example, 100 volts) and plasmatrons operate on 10's of volts (for example, 100 volts). Fuel cells can generate currents in the range of 10–10,000 amps dc.

Figure 2:
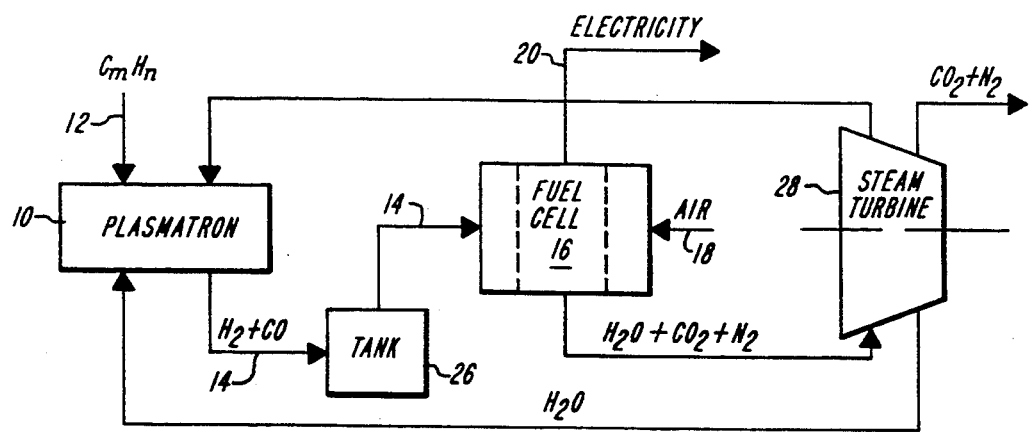
FIG. 2 is a schematic illustration of a plasmatron-fuel cell power plant.

Another embodiment of the invention particularly well suited to decentralized power generation applications is shown in FIG. 2. In this embodiment the plasmatron 10 receives the hydrocarbon fuel 12 to generate hydrogen rich gas 14 which may be stored in a tank 26. The hydrogen-rich gas 14 is supplied to the fuel cell 16 to generate electricity 20 as in the embodiment of FIG. 1. If the fuel cell 16 is a high temperature fuel cell, a combination of steam, carbon dioxide and nitrogen is fed into a turbine 28 to generate additional electricity. It may also be possible to use the high temperature gas for cogeneration heating. In both the embodiments of FIG. 1 and FIG. 2, an energy flow analysis set forth below shows that the plasmatron 10 consumes no more than approximately 20% of the heating value of the hydrocarbon fossil fuel and that the overall chemical energy to electricity conversion efficiency of the plasmatron-fuel cell system would be at least 30% and can be as high as 48%.

The energy flow analysis herein calculates the fraction of energy necessary to operate the plasma generator to produce hydrogen-rich gas for the fuel cell from hydrocarbon fossil fuels (natural gas, diesel, gasoline, etc.).

The plasma generator takes hydrocarbon fuels and water and, using electricity, generates gas (70–80% $H_2$ and 20–30% CO) or gas and soot (70–80% $H_2$ and 20–30% C). The fuel cell, using this gas and air, produces electricity, which can be applicable to the plasma generator.

In this analysis, the following symbols will be used.

$E_{in}$—chemical energy combustion of hydrocarbons
$E_{out}$—electrical energy from fuel cell
$\eta_{overall}$—overall efficiency (chemical to electrical)
$\delta$—chemical energy of the reformate divided by chemical energy of the fuel.
$\eta_{FC}$—efficiency of fuel cell conversion of thermal energy to electrical energy $$R = \frac{E_{chemical} \text{ from plasmatron}}{\text{Electrical into plasmatron}} = \frac{\text{chemical energy content of fuel generated by the plasmatron}}{\text{electrical energy consumed by the plasmatron}}$$

$$E_{out} = \eta_{FS} \times \eta_{plasm} \times E_{in} - 1/R\eta_{plasm} \times E_{in} = \eta_{plasm} \times E_{in}(\eta_{FC} - 1/R);$$

Overall efficiency of the system, $\eta_{overall}$ $$\eta_{overall} \simeq \frac{E_{out}}{E_{in}} = \rho(\eta_{FC} - 1/R)$$

$\eta_{FC}$—could be 0.6
$\delta = 1.1 – 1.4$
R—heating ratio calculated from thermodynamic analysis.

The relatively high value of the $\eta_{FC}$ makes it possible for R to be relatively low without decreasing $E_{out}/E_{in}$ to unacceptably low values. This feature could be particularly important when operating in a mode that reduces $CO_2$ production by not using the C energy.

The specific power consumption for equilibrium conversion of methane by steam at 2000K is $\infty_{CH_4+H_2O} = 6.8$ MJ/kg ($CH_4+H_2O$) and $\infty_{CH_4} = 14$ MJ/kg ($CH_4$)

If 90% of the electricity can be converted into thermal energy required for methane conversion $$E_{elect} = 6.88/0.9 = 7.5 \text{ MJ/kg}$$

Heating value of methane reformate $E_{chem} = 33$/MJ/kg of reformate $$R_{CH_4} = 33/7.5 \approx 4.4$$

$$\eta_{overall} = \frac{E_{out}}{E_{in}} = 1.3(0.6 - 1/4.4) = 0.48$$

Fraction of the energy necessary for the plasmatron to produce hydrogen-rich gas:

$$\frac{1}{R} = \frac{E_{electric}}{E_{chem}} \times 100\% \approx \frac{7.5}{33} \times 100 = 22.7\%$$

According to thermodynamic analysis described in Suris, A. L., *Handbook of the Thermodynamic High Temperature Process Data* (1987), the specific power consumption for obtaining hydrogen and carbon monoxide from different hydrocarbons ($CH_4$; $C_2H_6$; $C_3H_8$; $C_4H_{10}$; $C_5H_{12}$; $C_6H_{14}$; $C_2H_4$) differs insignificantly.

To convert liquid hydrocarbons by water, the value of specific power consumption should be increased by the value of heat vaporization of diesel, gasoline, etc.

$$\frac{1}{R} \approx \frac{E_{electric}}{E_{chem}} \times 100\% = 8.4\%$$

Figure 3:
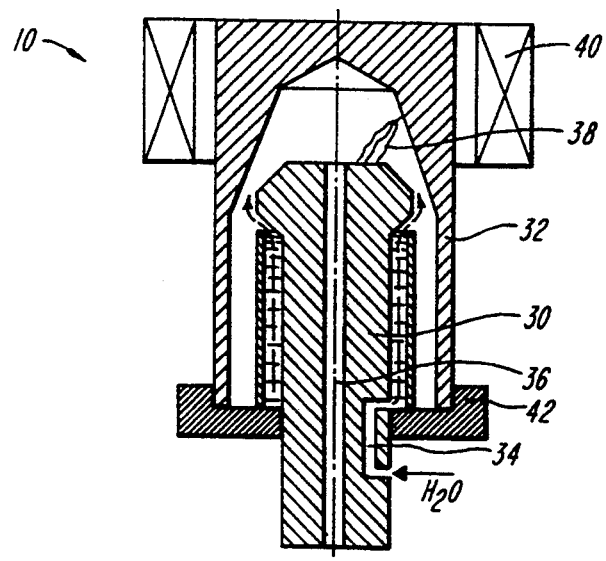
FIG. 3 is a cross-sectional view of a water plasmatron.

The two major elements of the system of the present invention, the plasmatron 10 and the fuel cell 16 will now be discussed in detail. With reference now to FIG. 3 the plasmatron 10 includes an anode 30 and a cathode 32. Water is introduced into the space between the anode 30 and cathode 32 through a feed channel 34. The hydrocarbon fuel 12 (FIG. 1) may be mixed with the water feed or introduced separately through a channel 36. A voltage impressed across the anode 30 and cathode 32 creates a plasma arc 38. A magnetic coil 40 is provided to cause the arc 38 to rotate so as to minimize wear on the anode 30 and cathode 32 structures. As will be appreciated by those skilled in the art, the anode 30 and cathode 32 are supported on an electrically insulating structure 42. A typical plasmatron 10 for vehicular applications shown in FIG. 3 might be six inches across and ten inches high. A 20 kW plasmatron, the largest device considered necessary for vehicular applications, would have a diameter in the range of 0.1–0.2 m (0.5–0.7 ft.) and a length of 0.2–0.25 m (0.7–0.8 ft.). Because of its small size and simple design, the plasmatron 10 fits easily into a vehicle and can be replaced in a few minutes. A plasmatron will have a lifetime of more than 1,000 hours. The plasmatron 10 will operate on a variety of fossil fuels including gasoline and diesel fuel. Typically, the plasmatron 10 will produce hydrogen-rich gases from gasoline and other hydrocarbon fuels with a greater than 90% efficiency in converting input electrical energy into thermal energy to process the gas, operating in the temperature range of 1,000°–3,000° C. The output of the plasmatron 10 is approximately typically 75–80% $H_2$ and 20–25% CO. In operation, the plasmatron 10 produces a plasma (an ionized, electrically conducting gas) using electricity. A mixture of hydrocarbon fuel, hydrogen and water is heated in the plasma to 1,000°–3,000° C. at atmospheric pressures. The gas mixture is converted mainly to hydrogen gas and simple carbon compounds (CO or C). The high temperatures achieved with the plasma are required to increase the reaction rates without the use of a catalyst.

Gaseous or liquid hydrocarbons are converted by steam in the plasma by the reaction $$C_mH_n + mH_2O \Delta mCO + (n/2+m)H_2$$

(where m and n represent the relative amounts of carbon and hydrogen). Temperatures at least in the range 1,000°–1,700° C. are required by the reaction kinetics of the species. In the presence of oxygen in the gas mixture (either from the water or the fuel), carbon monoxide is produced. The carbon monoxide can be directly used as a fuel in some types of fuel cells or may be converted into $CO_2$ and additional hydrogen by a water shift reaction.

Figure 4:
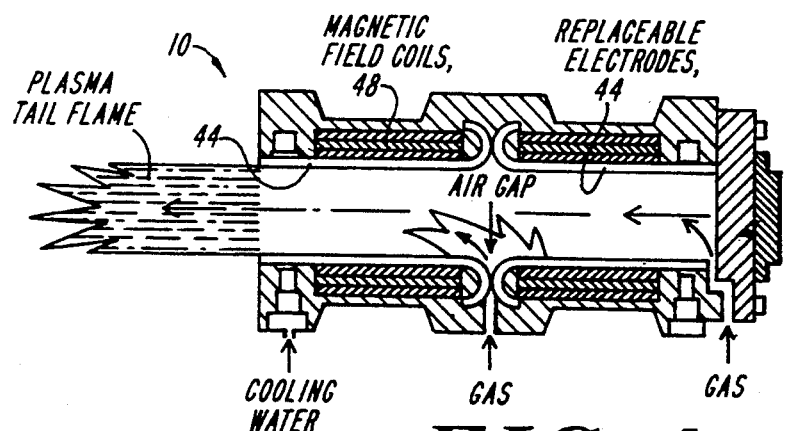
FIG. 4 is a cross-sectional view of another plasmatron design.

An alternative plasmatron design with power in the range of 0.2–5 MW and a flow rate of 40–10,000 $m^3/h$ is shown in FIG. 4. The plasmatron 10 includes two water cooled copper tubular electrodes 44 connected by a vortex generating gas injection chamber 46. A spark occurs in the gap between the electrodes 44 and the incoming feedstock gas immediately blows the arc from the gap into the interior of the arc chamber. There it is rotated at speeds of about 1,000 revolutions per second by interaction of the arc current with a magnetic field set up by internally mounted solenoid coils 48. This type of plasmatron is simple, reliable, and can operate on a broad range of working gases.

In order to eliminate production of carbon monoxide and thereby eliminating $CO_2$ production, the plasmatron 10 may be operated in a water free pyrolytic (oxygen-deficient) mode in which the decomposition products produced by the plasmatron are hydrogen and carbon (soot), according to the following reaction $$C_mH_n \Delta mC + n/2H_2.$$

The other major component of the system of the present invention is the fuel cell in which hydrogen-rich gas and oxygen from air flow through porous electrodes to create electric current as the chemical reactions release electrons at one electrode and absorb them at the other. Fuel cells have been used extensively in specialized applications such as for power generation on spacecraft. Particular fuel cell applications are discussed by Patil, Pandit G., in "U.S. Department of Energy Fuel Cell Program for Transportation Applications," *Journal of Power Sources*, 37 (1992) 171–179; Appleby, A. J., "Fuel Cell Technology and Innovation," *Journal of Power Sources*, 37 (1992) 223–239 and "Fuel Cells for Urban Power" *EPRI Journal*, September 1991. Various types of fuel cells are appropriate for the system of the invention. Some types may be better suited to vehicular applications and others better suited to decentralized power station applications. Fuel cells well suited to vehicular activities are the alkaline fuel cell (AFC), the phosphoric acid fuel cell (PAFC), the proton exchange membrane fuel cell (PEMFC), the solid oxide fuel cell (SOFC) and the alkaline fuel cell (AFC), all using hydrogen fuel provided by an external reformer or by a storage tank. See also, van Den Broeck, H., "Application of Fuel Cells for large vehicles" in *Fuel Cell: Trends in Research and Applications* (1987) and Srinivasan, S., "Fuel Cells for Extraterrestrial and Terrestrial Applications" *J. Electrochem. Soc.*, 136 (2), February (1989). While alkaline fuel cells require pure hydrogen, they also require little or no platinum catalyst and have very fast start up times and high efficiency. These alkaline fuel cells are highly intolerant to carbon monoxide and carbon dioxide; the presence of these gases results in the formation of carbonate in the electrolyte with a loss in performance. The other fuel cells are more tolerant. The development of processes for CO and $CO_2$ removal is required so that fuels produced from steam reforming of hydrocarbons can be used as feed stocks for alkaline fuel cells and also for some of the other fuel cells. One approach is to operate the plasmatron in the water free mode which will produce pure hydrogen and soot allowing it to be used with the alkaline fuel cell.

Phosphoric acid fuel cell technology has the advantage of being in the most advanced stage of development and of being tolerant to carbon monoxide ($\leq 1\%$). The main limitations of the PAFC system for transportation applications are the relatively low power density, long start up time, and insufficient stability of some of the fuel cell components. A plasmatron operated in either the water mode or the water-free mode with the production of very pure hydrogen gas may be combined with the PAFC.

The proton exchange membrane fuel cell, PEMFC, has the potential advantage of fast start up, since it can produce appreciable power at temperatures close to 0° C., and high power density. The PAFC and the PEMFC can be used with $H_2+CO_2$ gas. A plasmatron may be combined with the PEMFC in the same way as with PAFC and may use gasoline, diesel fuel or other types of hydrocarbon fuels.

The solid oxide fuel cell is compact, lightweight, and operates at 900°–1,000° C. Because the electrolyte is solid, the electrolyte management problems associated with AFC and PAFC are eliminated. Also, because of the high operating temperature, hydrogen and carbon monoxide may be used as fuels. The plasmatron thus does not have to operate in the pyrolytic mode. Plasmatron operation is compatible with SOFC because it would almost completely convert hydrocarbon fuels into a mixture of $H_2$ and CO. The plasmatron-SOFC system can be adapted to use the exiting hot gasses from the fuel cell to preheat the gases prior to injection into the plasmatron thereby increasing overall efficiency.

Fuel cells suited to decentralized power generation applications are phosphoric acid fuel cells (PAFC), molten carbonate fuel cells (MCFC), and the solid oxide fuel cell (SOFC). The most preferred fuel cells for power generation applications are the molten carbonate and solid oxide fuel cells because they provide heat from the hot exhaust gasses for the cogeneration of electricity. Combination of the plasmatron with the MCFC and SOFC is compact and relatively simple. The space necessary for a nominal 2 MW molten carbonate fuel cell plant is less than 4,500 square feet. See Douglas, J., *EPRI Journal*, p.5, September (1991). The required 200–300 kW plasmatron would have a diameter in the range of 0.7–1 ft. and a length of 1.3–2 ft. The solid oxide fuel cell is likely to be more compact and light weight than the MCFC.

The MCFC is now approaching utility demonstration in a 100 kW scale unit. Because of its high operating temperatures, hydrogen and carbon monoxide may be used as fuels for the MCFC. Thus, plasmatron operation is quite compatible with the MCFC because the plasmatron almost completely converts hydrocarbon fuels into $H_2$ and CO.

Figure 5:
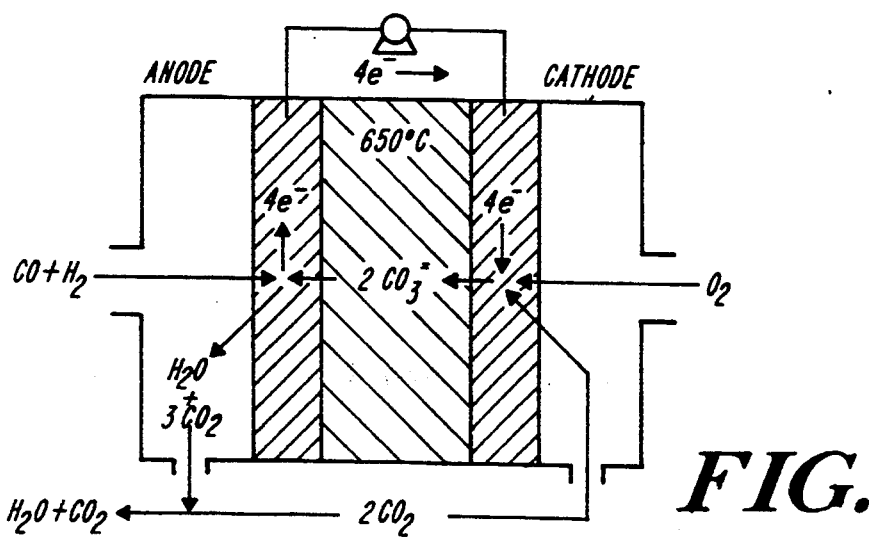
FIG. 5 is a schematic illustration of a molten carbonate fuel cell.
Figure 6:
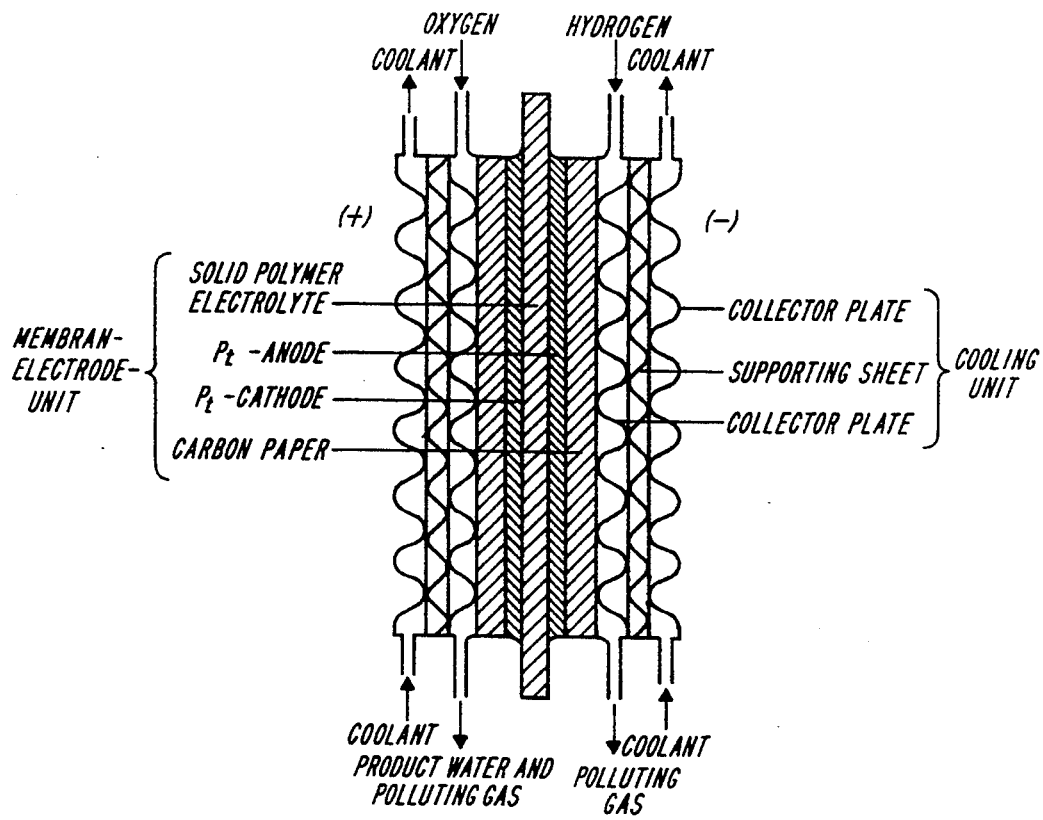
FIG. 6 is a schematic illustration of a photon exchange membrane fuel cell.

A representative molten carbonate fuel cell is shown in FIG. 5. This fuel cell is described by Appleby, A. J. and Foulkes, F. R., *Fuel Cell Handbook*, VanNostrund Reinhold, New York, N.Y. 541, 1985. A representative proton exchange membrane fuel cell is illustrated in FIG. 6 and described by Strasser, K., *Journal of Power Sources*, 37 (1992) 211. The teachings of all of the fuel cell references set forth above are hereby incorporated by reference and are made a part of this application.

Figure 7:
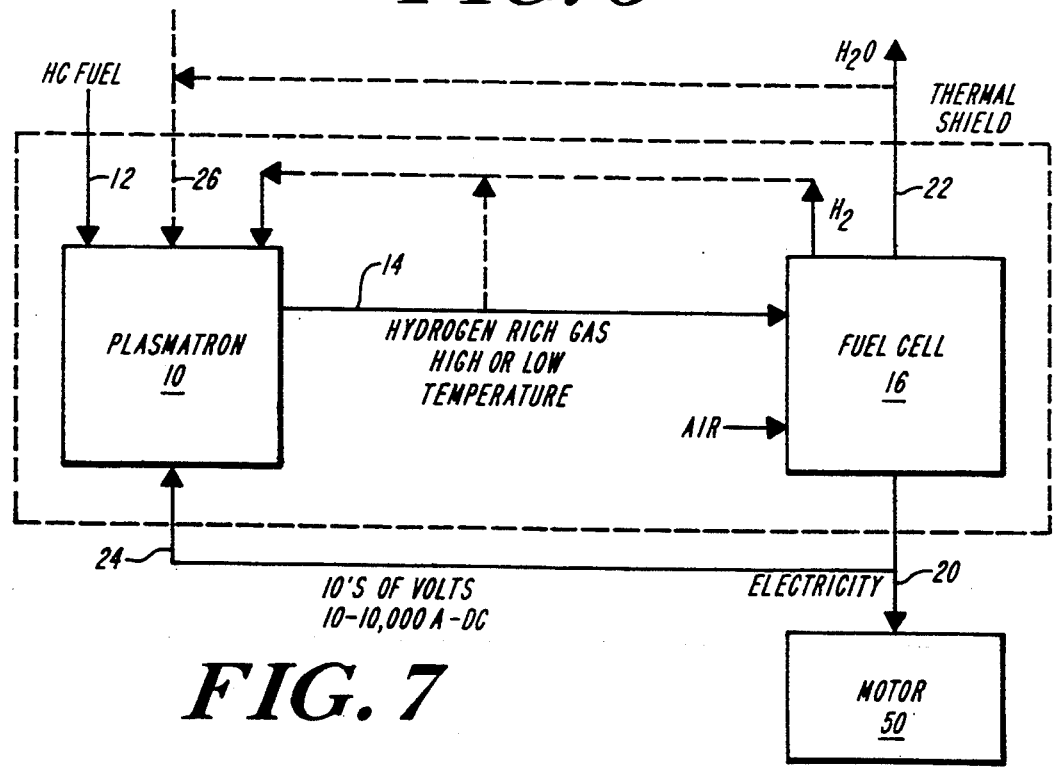
FIG. 7 is a schematic illustration of a plasmatron-fuel cell system for direct drive applications.
Figure 8:
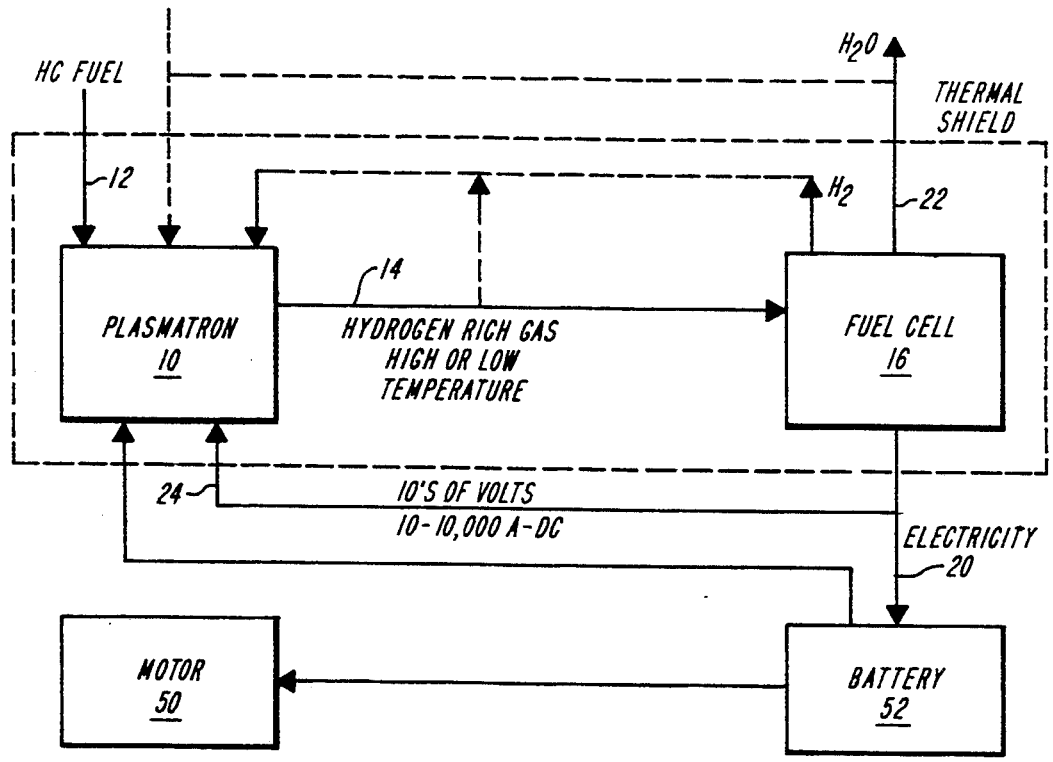
FIG. 8 is a schematic illustration of a plasmatron-fuel cell system for battery-hybrid applications.

With reference now to FIG. 7 the plasmatron 10-fuel cell 16 combination is used in a direct drive application to power an electric motor 50. The configuration of FIG. 7 is particularly well suited to a vehicular application such as for an automobile, a truck, or a bus. In such a case the motor 50 would use conventional automotive drive train components for turning the drive wheels in the particular vehicle. An alternative vehicular application is shown in FIG. 8. In this embodiment a battery 52 receives the electricity 20 generated by the fuel cell 16. The battery 52 in turn is connected to power the motor 50. The battery thus can provide the power peaking required for vehicular operation while the fuel cell satisfies the steady-state power requirements.

Because of the near-term high cost of fuel cells, a fuel cell/battery hybrid as shown in FIG. 8 will be advantageous for vehicular applications. However, if the cost of fuel cell decreased to a few hundred dollars per kW or less a system driven entirely by a fuel cell directly would be feasible as shown in FIG. 7. For such a direct drive system, a plasmatron capable of load following is mandatory. Such load following can be achieved by intermittent operation described below. In the hybrid fuel cell-battery configuration of FIG. 8 the plasmatron-fuel cell system operates continuously, providing enough power to recharge the battery 52. The system is sized to meet the largest steady state load requirement of the vehicle. As discussed above, a plasmatron starts up quickly (in a few seconds), and easily responds to load changes. Plasmatrons are optimized for a given gas throughput, and reduced throughputs (for load following) result in decreased efficiency. To avoid reduced efficiency, the plasmatron 10 may be operated in a cycled, lower duty cycle mode. In this mode, the plasmatron operates at full output, but only for short periods of time. The hydrogen so produced may be stored during periods of plasmatron operation for future use by the fuel cell.

In the embodiments of FIGS. 7 and 8, the plasmatron-fuel cell system is started by a battery, for example, the battery 52 in FIG. 8, capable of producing 3–5 kW (50–80 v, 50–80 A). Small start-up energies are required because of the fast start of the plasmatron. The battery 52 is recharged during the steady state operation by the fuel cell 16. In this method of starting, the plasmatron is ignited first, followed by beginning of operation of the fuel cell. Alternatively, the fuel cell could be started up first using a small amount of hydrogen or methanol stored on board the vehicle. The power from the fuel cell is then used to start the plasmatron for steady state operation.

For hybrid plasmatron/fuel cell/battery applications as shown in FIG. 8 approximately 100 kW during a ten second period is required for vehicle acceleration. It thus takes about 1 MJ of energy for each acceleration. For urban operation, if the power during deceleration is not saved, then the average power that needs to be delivered by the fuel cell to recharge the battery 52 is about 10 kW, on top of the urban cruising power, assuming that the vehicle accelerates every 1.5 minutes. Since the urban cruising power is about 10 kW then the power from the fuel cell 16 to provide cruising and recharging is about 20 kW, which well agrees with the value required for cruising on a highway. By decreasing the energy drain from the battery charge/discharge cycle to less than approximately 3% of the full charge, the battery will last almost indefinitely. Since the energy discharged from the battery is about 1 MJ (during acceleration), then the full charge of the battery is about 30 MJ, or about 10 kW-HR. An ordinary lead acid car battery usually has about 50–100A-HR, or about 1 kW-HR. Therefore, the equivalent of about 10 ordinary automotive batteries is required. The charge/discharge cycling in battery-driven vehicles results in decreased battery lifetime.

Figure 9:
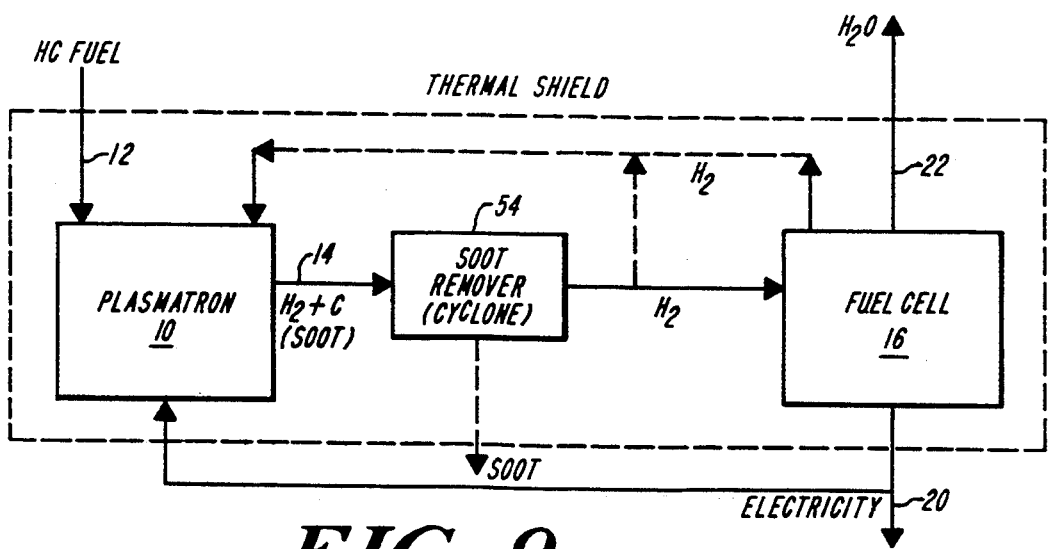
FIG. 9 is a schematic illustration relating to the water-free operation of a plasmatron.

FIG. 9 illustrates an embodiment of the invention for water free operation of the plasmatron 10. In this embodiment, the plasmatron 10 is operated without water as discussed above so that the reformed products constitute hydrogen rich gas $H_2$ plus elemental carbon in the form of soot. The hydrogen/soot combination enters a soot remover 54 which may be of a cyclone type for separating and removing the soot from the hydrogen gas. Thereafter the hydrogen gas is introduced into the fuel cell 16 as in the other embodiments. Since the reformed gas, laden with soot, leaves the plasmatron 10 at very high speeds (100 meters per second and higher), a relatively small cyclone is sufficient to remove the soot.

Figure 10:
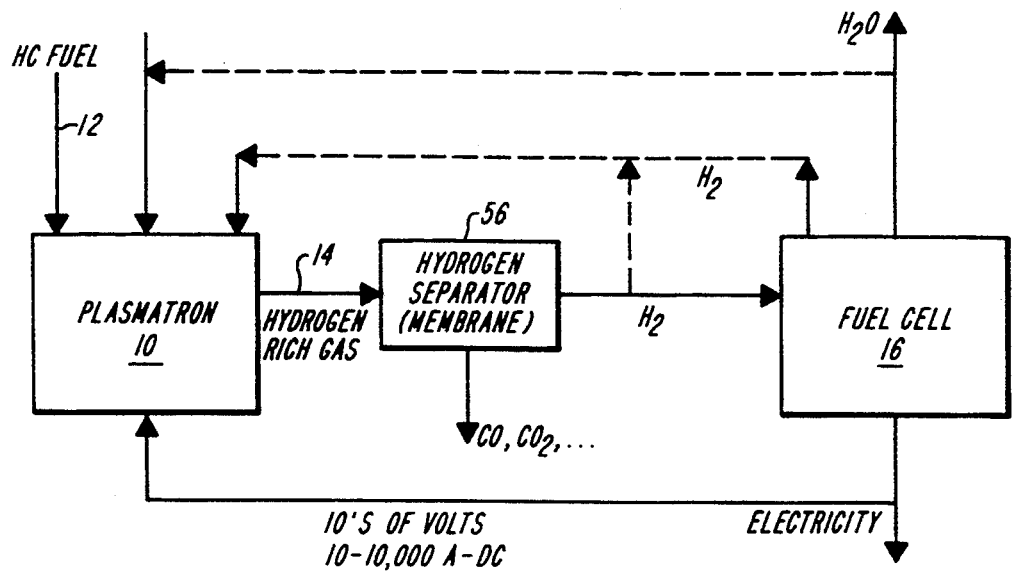
FIG. 10 is a schematic illustration of a plasmatron-fuel cell with membranes for minimization of contaminants into fuel cell.

Yet another embodiment of the invention is illustrated in FIG. 10. In this embodiment, a hydrogen separator 56 employs membranes for separating the desired hydrogen output from carbon containing species such as carbon monoxide and carbon dioxide. Suitable membranes for use in the hydrogen separator 56 are composite microporous glass membranes or palladium based membranes.

Figure 11:
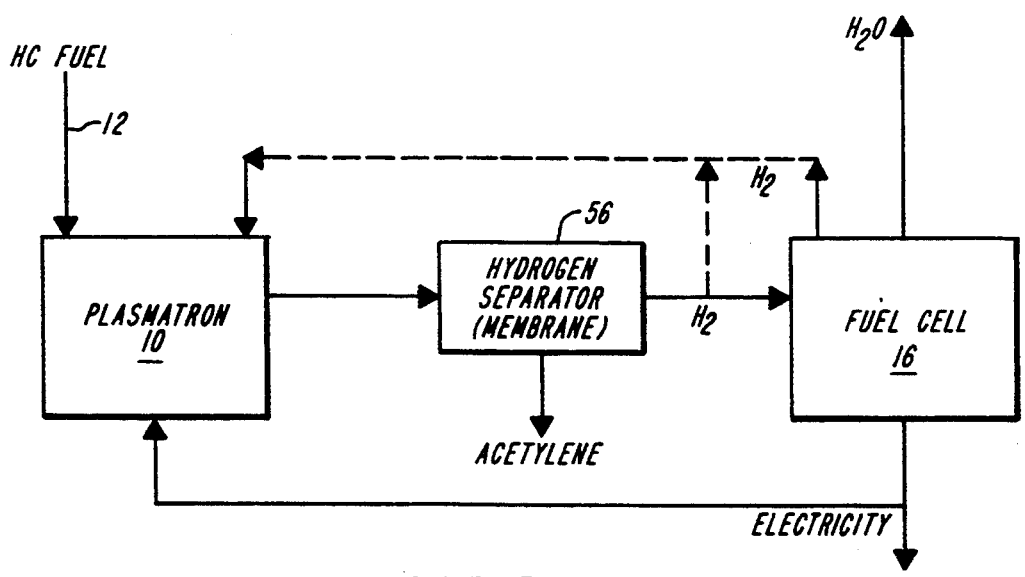
FIG. 11 is a schematic illustration of a plasmatron-fuel cell with hydrogen separator (membrane) for acetylene production.

FIG. 11 is yet another embodiment of the invention. In this embodiment, the output of the plasmatron 10 is a mixture of hydrogen and acetylene which is introduced into a hydrogen separator membrane 56. As in earlier embodiments, the hydrogen is introduced into the fuel cell 16 to generate electricity while the separated acetylene is collected.

Figure 12:
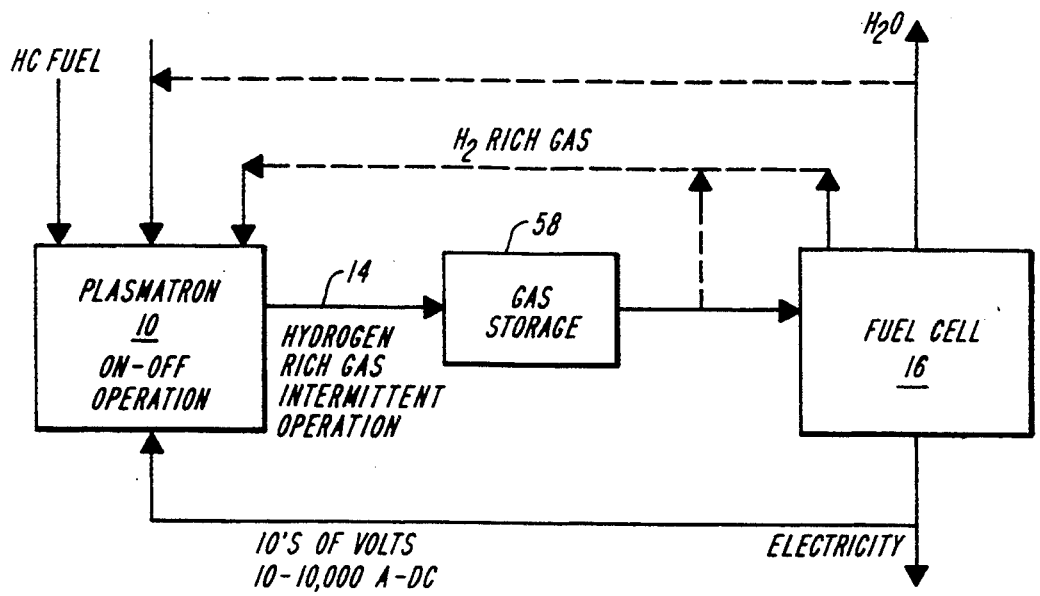
FIG. 12 is a schematic illustration of an intermittently utilized plasmatron for variable power applications.
Figure 13:
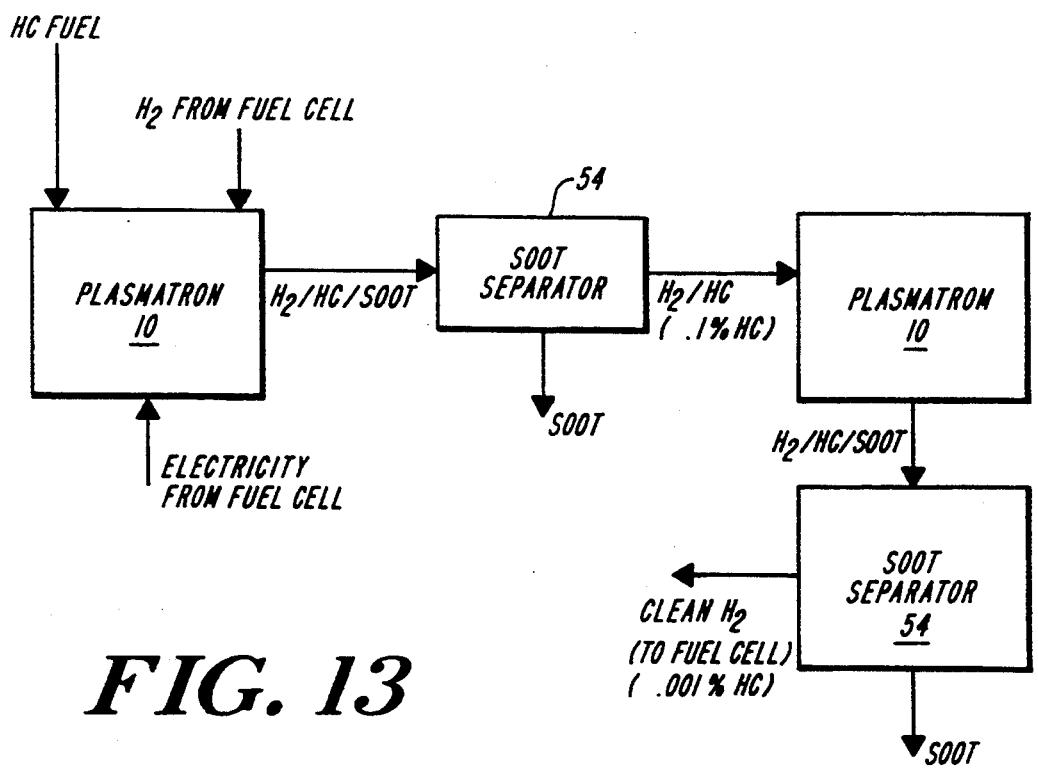
FIG. 13 is a schematic illustration of a fuel cell system of the invention for miminization of hydrocarbon emissions.
Figure 14:
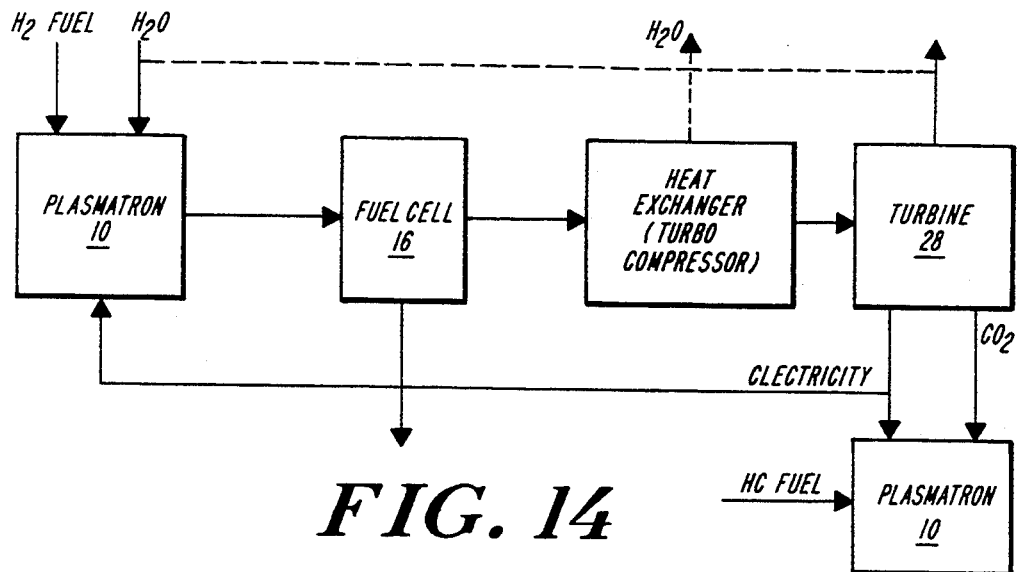
FIG. 14 is a schematic illustration of a plasmatron/fuel cell system for electricity and synthesis gas production.
Figure 15:
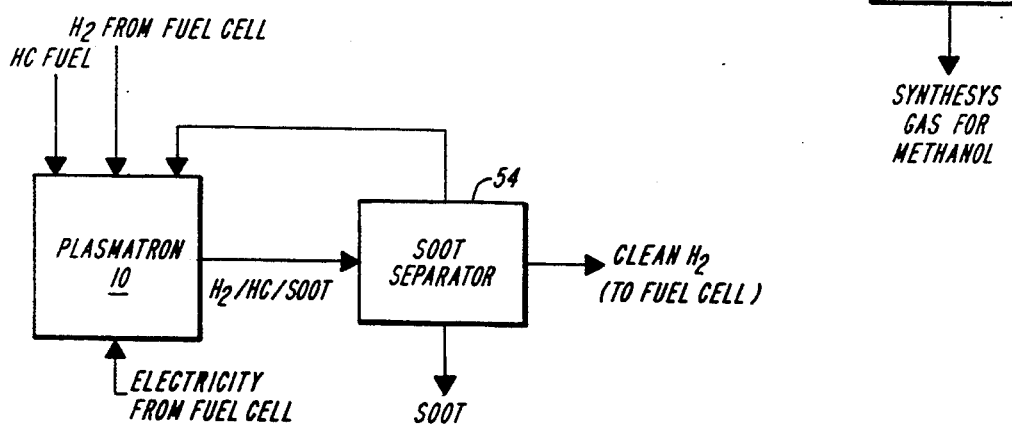
FIG. 15 is an alternative embodiment for the elimination of hydrocarbons content in fuel cell gas input.

FIG. 12 discloses an embodiment used for intermittent plasmatron 10 operation. In this configuration, the plasmatron 10 is operated in an on and off mode. As hydrogen rich gas 14 is generated by the plasmatron 10, it is stored in a gas storage structure 58. From gas storage structure 58 the hydrogen rich gas then is introduced into the fuel cell 16 for the generation of electricity as in the earlier described embodiments. This method of operation is optimum for partial power operation (since plasmatrons are optimized for a given set of operational conditions). FIG. 13 discloses an embodiment of the system of the invention for minimization of hydrocarbons. In this embodiment, the output from the plasmatron 10 which includes hydrogen and small amounts of hydrocarbon and soot is introduced into a first separator 54. The output of the separator 54 contains hydrogen gas and approximately 1/10% hydrocarbon. This combination is introduced into a second plasmatron 10 and the output enters a second soot separator 54. The output of the second soot separator 54 is very clean hydrogen gas which is supplied to a fuel cell (not shown in FIG. 13). The output from the second soot separator 54 contains less than 0.001% hydrocarbons. The configuration of FIG. 13 is well suited for use with fuel cells which require very pure hydrogen. FIG. 14 shows an embodiment of a plasmatron/fuel cell system for electricity and synthesis gas production. Still another embodiment for the elimination of unwanted hydrocarbons is shown in FIG. 15. In this case the output from the plasmatron 10 includes hydrogen, unwanted hydrocarbons and soot. This combination is introduced into the soot separator 54. A fraction of the gas after the soot separator is reintroduced into the plasmatron; the rest is introduced into the fuel cell.

Figure 16:
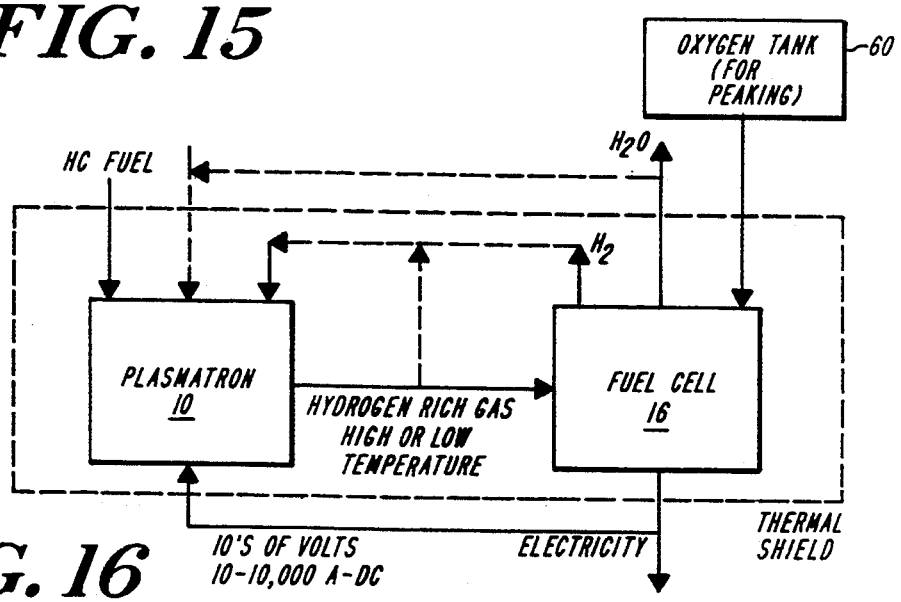
FIG. 16 is a schematic illustration of an embodiment employing oxygen storage and feed for variable power applications.

Yet another embodiment of the invention is shown in FIG. 16. In addition to the plasmatron 10 and the fuel cell 16 there is provided an oxygen tank 60 for storing oxygen. When additional electrical power is required from the fuel cell 16, oxygen from oxygen tank 60 is introduced into the fuel cell 16. By operating the fuel cell with oxygen rather than air, the power from the fuel cell is increased approximately 5 times over what it would be when operated on air. The system may be automated so that oxygen is automatically supplied to the fuel cell upon increases in electrical demand.

Other possible alternative approaches for CO elimination is incomplete pyrolysis producing hydrogen and acetylene according to the reaction $C_mH_n \Delta m/2 C_2H_2 + (n-m)/2H_2$ (FIG. 11). The acetylene, which is a valuable product, is separated and sold. In such a reaction, the gas mixture contains more than 60% hydrogen, 17% acetylene and 7% ethylene. Another method for partially eliminating carbon dioxide emissions is separation of $CO_2$ from the exhaust gases after they exit the high temperature fuel cell (for example, by washing with monoethanolamine) followed by plasma conversion of hydrocarbons into synthesis gas $(CO+H_2)$, according to the reaction $C_mH_n + mCO_2 \Delta 2mCO + n/2H_2$. The synthesis gas thus obtained can be used for methanol production, a valuable byproduct (FIG. 14).

For pyrolysis of various hydrocarbons, the principal components over a wide range of temperatures (1000°/2000° C.) consist of condensed carbon and hydrogen. Acetylene appears at temperatures higher than 1500° C., and at 3000° C., the gas mixture contains primarily hydrogen and acetylene. This feature of the system of the invention can be utilized for providing incomplete pyrolysis of hydrocarbons to acetylene and hydrogen to prevent obtaining condensed carbon. Also, increasing the hydrogen concentration in the starting reagents (by recirculating excess hydrogen from the fuel cell) causes a significant narrowing of the temperature range during which condensed carbon is produced.

Figure 17:
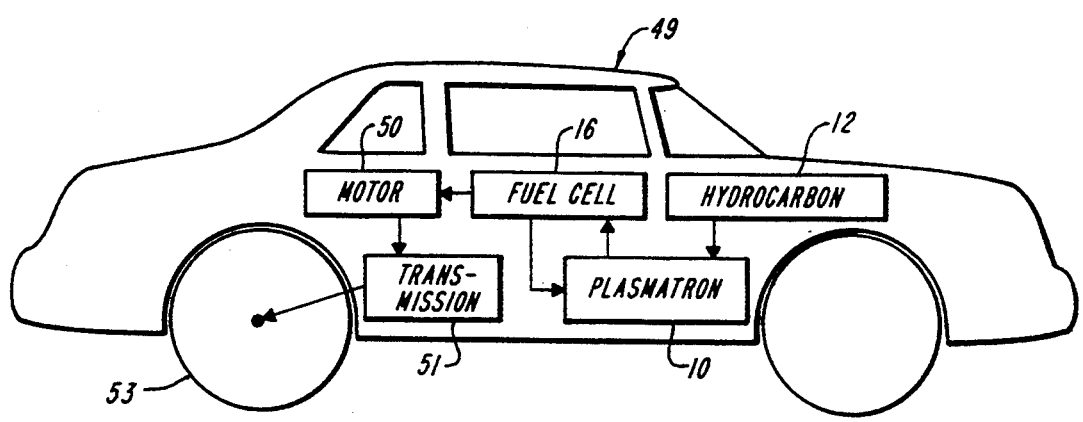
FIG. 17 is a schematic illustration of vehicle including the system of the invention.
Figure 3:
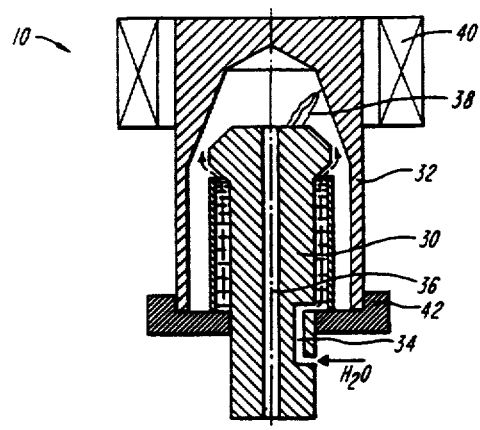
Figure 4:
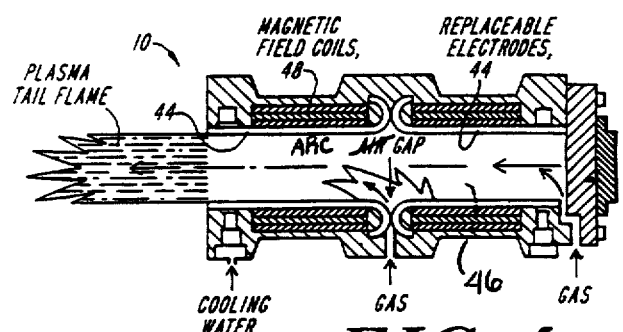
Figure 5:
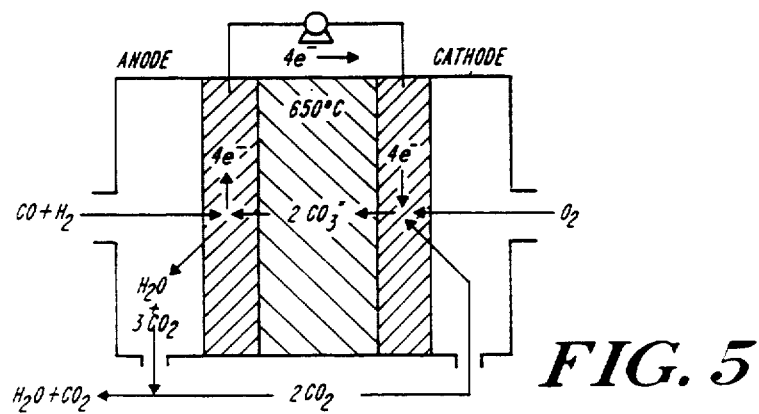
Figure 8:
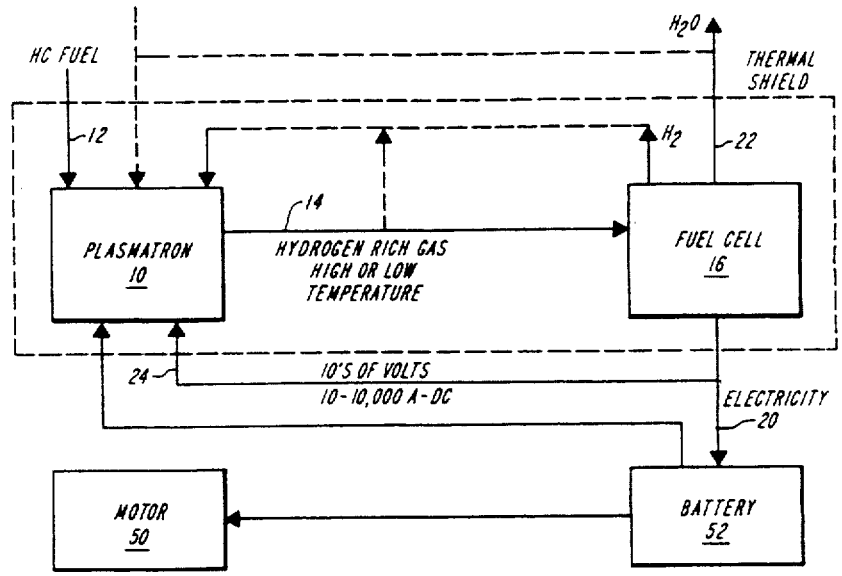
Figure 9:
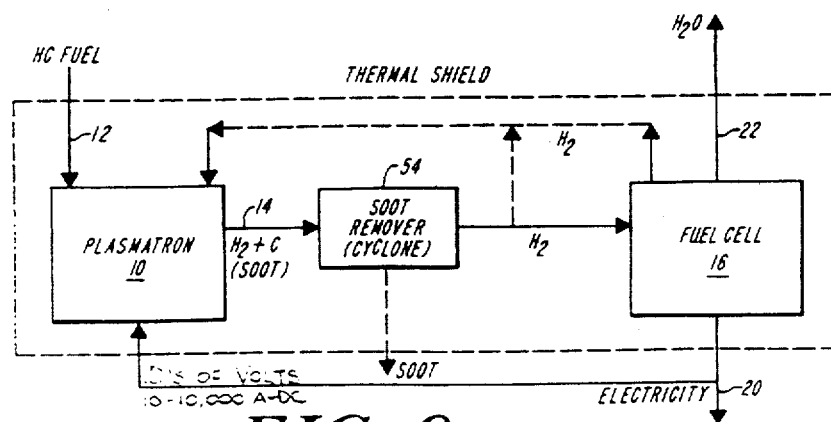
Figure 10:
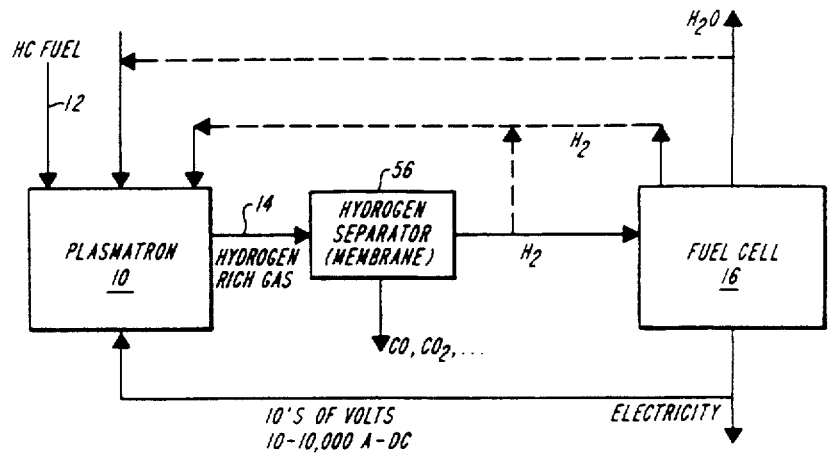
Figure 11:
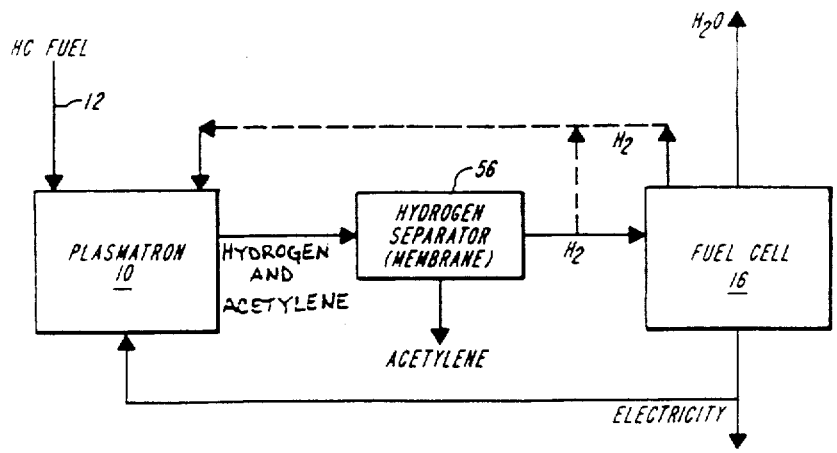
Figure 12:
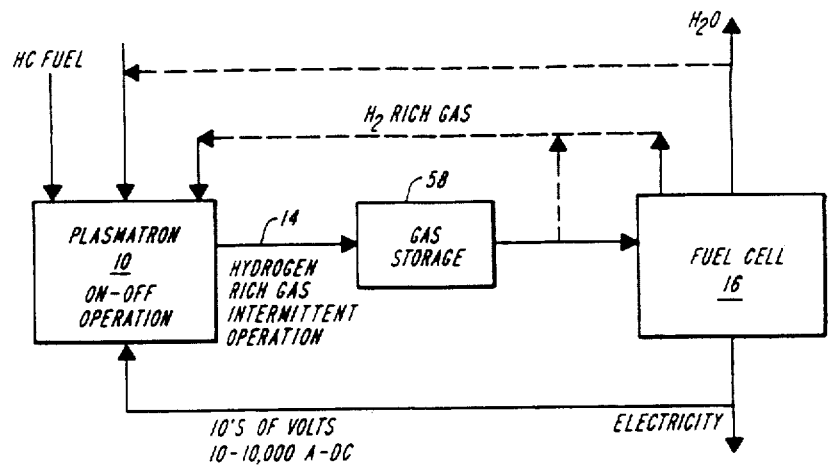
Figure 13:
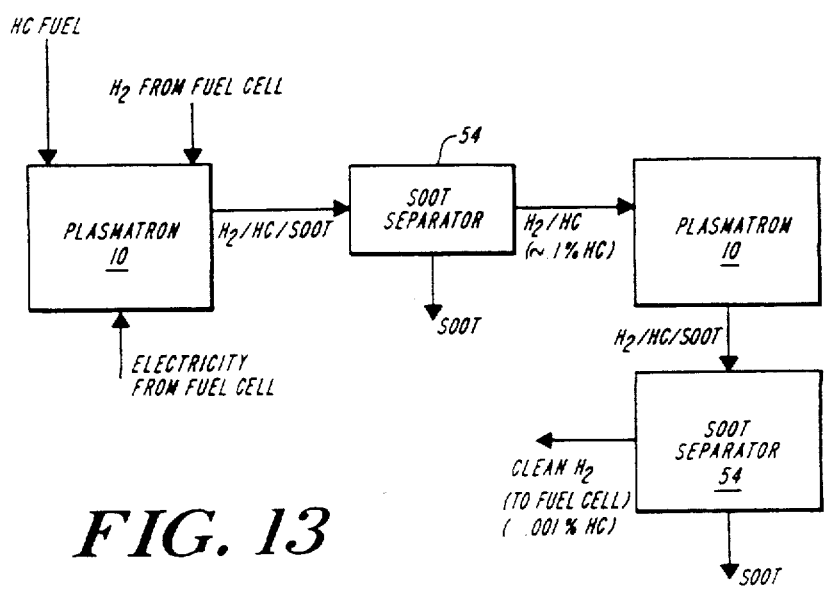
Figure 14:
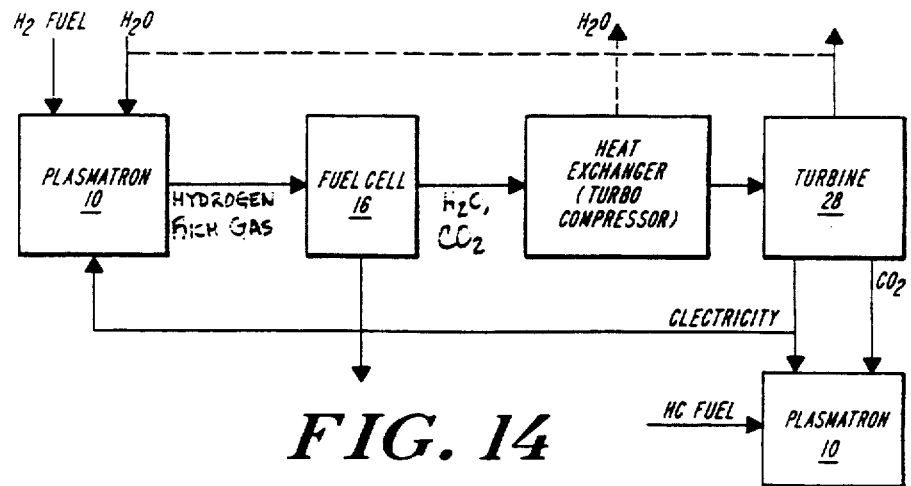
Figure 15:
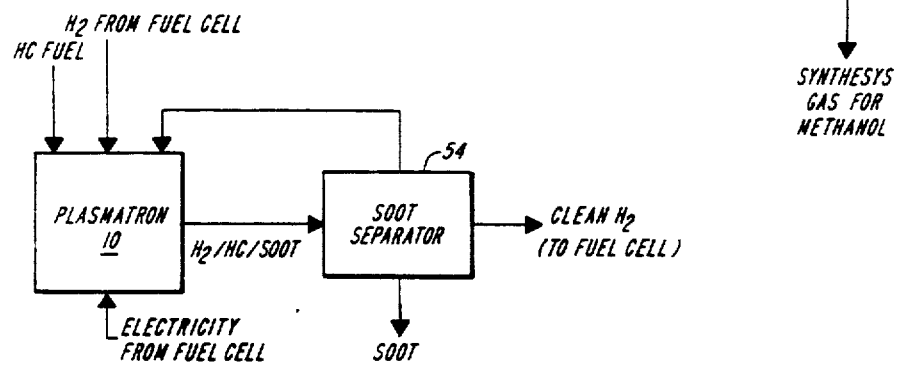
Figure 16:
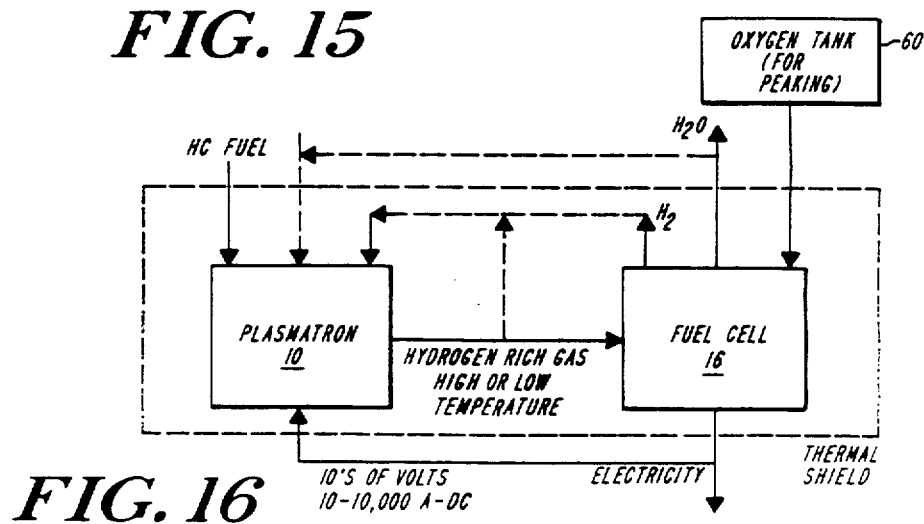

FIG. 17 illustrates a motor vehicle 49 powered by the system of the invention. In particular, hydrocarbon fuel 12 is introduced into the plasmatron 10 which generates hydrogen gas. The hydrogen gas is introduced into the fuel cell 16 which generates electricity and delivers it to the motor 50. The electric motor 50 is coupled through transmission 51 to drive the rear wheels 53 of the vehicle 49.

Although the described embodiments illustrate the use of hydrogen being supplied to the fuel cell component of the invention, it should be recognized that other species such as ammonia may be used in fuel cells, and it will be appreciated by those skilled in the art that plasmatrons can produce such molecular species for use in fuel cells. All such species are intended to be included within the scope of the appended claims which appear after the appendix.

What is claimed as:

1. Apparatus for generating electricity comprising:
    a plasmatron for generating a gaseous molecular species; and
    a fuel cell connected to receive the gaseous species from the plasmatron to generate electricity, a portion of the generated electricity being supplied to the plasmatron.

2. Apparatus for generating electricity comprising:
    a plasmatron for generating a hydrogen-rich gas from a hydrocarbon; and a fuel cell connected to receive the hydrogen-rich gas from the plasmatron to generate electricity, a portion of the generated electricity being supplied to the plasmatron.

3. The apparatus of claim 1 or claim 2 wherein the plasmatron is a water plasmatron.

4. The apparatus of claim 1 or claim 2 wherein the plasmatron is water free.

5. The apparatus of claim 1 or claim 2 wherein the fuel cell is a molten carbonate fuel cell.

6. The apparatus of claim 1 or claim 2 wherein the fuel cell is a solid oxide fuel cell.

7. The apparatus of claim 1 or claim 2 is an alkaline fuel cell.

8. The apparatus of claim 1 or claim 2 wherein the fuel cell is a phosphoric acid fuel cell.

9. The apparatus of claim 1 or claim 2 wherein the fuel cell is a proton exchange membrane fuel cell.

10. The apparatus of claim 1 or claim 2 further including an electric motor connected to the output of the fuel cell.

11. The apparatus of claim 1 or claim 2 further including a turbine connected to receive hot gases from the fuel cell for the co-generation of electricity.

12. The apparatus of claim 1 or claim 2 wherein hot gases are used for chemical processing in an cogeneration facility.

13. The apparatus of claim 1 or claim 2 wherein the plasmatron reforms hydrocarbon fuels into substantially only $H_2$ and soot.

14. The apparatus of claim 1 or claim 2 wherein the plasmatron produces $H_2$ and soot and further including a cyclone soot remover adapted to separate the soot.

15. The apparatus of claim 1 or claim 2 wherein the plasmatron is adapted to produce hydrogen and acetylene, and further including means for separating the hydrogen from the acetylene.

16. The apparatus of claim 1 or claim 2 further including a battery for receiving the electrical output from the fuel cell and a motor connected to receive electricity from the battery.

17. The apparatus of claim 1 or claim 2 further including gas storage structure for receiving gas from the plasmatron and for delivering the gas to the fuel cell.

18. The apparatus of claim 1 or claim 2 including a first source of oxygen connected to the fuel cell and further including an additional source of oxygen enriched air connected to the fuel cell for delivering oxygen to the fuel cell for providing power peaking.

19. The apparatus of claim 1 or claim 2 further including a second plasmatron for receiving gases from the plasmatron to reduce unwanted species.

20. The apparatus of claim 1 or claim 2 further including a second plasmatron for receiving gases from the fuel cell and additional hydrocarbons to produce synthesis gas and additional hydrocarbons.

21. Method for starting a plasmatron/fuel cell system for generating electricity comprising:
Providing a plasmatron to generate a hydrogen-rich gas from a hydrocarbon;
Providing a fuel cell connected to receive the hydrogen-rich gas from the plasmatron to generate electricity and supply a portion of the generated electricity to the plasmatron;
Providing a battery connected to receive electricity from the fuel cell and to supply electricity to the plasmatron;
Delivering current from the battery to the plasmatron to initiate plasmatron operation to produce hydrogen-rich gas; and
Introducing the produced hydrogen-rich gas into the fuel cell to begin generation of electricity in the fuel cell.

22. Method for starting a plasmatron/fuel cell system for generating electricity comprising:
Providing a plasmatron to generate a hydrogen-rich gas from a hydrocarbon;
Providing a fuel cell connected to receive the hydrogen-rich gas from the plasmatron to generate electricity and supplying a portion of the generated electricity to the plasmatron;
Providing structure for storing hydrogen-rich gas and connected to supply the hydrogen-rich gas to the fuel cell;
Supplying hydrogen-rich gas from the hydrogen storage structure to the fuel cell to begin fuel cell operation to generate electricity; and
Applying a portion of the generated electricity to the plasmatron to begin its operation to supply hydrogen-rich gas to the fuel cell to sustain its operation.

23. The apparatus of claim 2 wherein the hydrocarbon is gasoline.

24. The apparatus of claim 2 wherein the hydrocarbon is diesel fuel.

25. The apparatus of claim 2 wherein the hydrocarbon is methanol.

26. The apparatus of claim 2 wherein the hydrocarbon is biomass derived fuel.

27. The apparatus of claim 2 wherein the hydrocarbon is coal derived fuel.

28. The apparatus of claim 2 wherein the hydrocarbon is natural gas.

29. The apparatus of claim 1 wherein the gaseous molecular species is ammonia.

30. A self propelled vehicle comprising:
a plasmatron for generating a hydrogen rich gas from a hydrocarbon;
a fuel cell connected to receive the hydrogen rich gas from the plasmatron to generate electricity, a portion of the generated electricity being supplied to the plasmatron;
an electric motor connected to receive electricity from the fuel cell; and
drive means connected to the motor for propelling the vehicle.

31. The self propelled vehicle of claim 30 further including a battery for receiving electricity from the fuel cell and for delivering electricity to the motor and to the plasmatron.

32. The self propelled vehicle of claim 30 further including hydrogen storage structure for receiving hydrogen rich gas from the plasmatron and for delivering hydrogen rich gas to the fuel cell.

33. The apparatus of claim 1 or claim 2 adapted to be portable.

* * * * *

UNITED STATES PATENT AND TRADEMARK OFFICE
CERTIFICATE OF CORRECTION

PATENT NO. : 5,409,784            Page 1 of 7
DATED : Apr. 25, 1995
INVENTOR(S) : Leslie Bromberg, et al It is certified that error appears in the above-indentified patent and that said Letters Patent is hereby corrected as shown below:

The drawing sheets consisting of Figs. 4, 9, 11, 13 and 14, should be deleted to be replaced with the drawing sheets consisting of Figs. 4, 9, 11, 13 and 14, as shown on the attached pages.

Column 4, line 35: please delete the following equation:

$$E_{out} = \eta FS \times \eta_{plasm} \times E_{in} - 1/R \eta_{plasm} \times E_{in} = \eta_{plasm} \times E_{in}(\eta FC - 1/R)$$

and insert therefor the following equation:

$$E_{out} = \eta FS \times \delta \times E_{in} - 1/R_{\delta} \times E_{in} = \delta \times E_{in}(\eta FC - 1/R)$$

Column 4, line 40: please delete "$\rho$" and insert therefor -- $\delta$ --;

Column 5, line 63: please delete "$\Delta$" and insert therefor -- $\rightarrow$ --;

Column 6, line 26: please delete "$\Delta$" and insert therefor -- $\rightarrow$ --;

UNITED STATES PATENT AND TRADEMARK OFFICE
CERTIFICATE OF CORRECTION

PATENT NO. : 5,409,784
DATED : Apr. 25, 1995
INVENTOR(S) : Leslie Bromberg, et al It is certified that error appears in the above-indentified patent and that said Letters Patent is hereby corrected as shown below:

Column 7, lines 32 and 41: please delete "gasses" and insert therefor -- gases --; and Column 10, lines 14 and 25: please delete "$\Delta$" and insert therefor -- $\rightarrow$ --.

Signed and Sealed this

Seventh Day of November, 1995

Attest:

BRUCE LEHMAN

Attesting Officer

Commissioner of Patents and Trademarks